United States Patent [19]

Richter

[11] 4,238,200

[45] Dec. 9, 1980

[54] PROCESS FOR THE PRODUCTION OF FUEL FROM FINE COAL FOR COAL PRESSURE GASIFICATION IN A FIXED BED REACTOR

[75] Inventor: Artur Richter, Mülheim, Fed. Rep. of Germany

[73] Assignee: STEAG Aktiengesellschaft, Essen, Fed. Rep. of Germany

[21] Appl. No.: 18,530

[22] Filed: Mar. 8, 1979

[30] Foreign Application Priority Data

Mar. 9, 1979 [DE] Fed. Rep. of Germany ....... 2810125

[51] Int. Cl.³ .................................................. C10L 5/20
[52] U.S. Cl. ..................................... 44/16 F; 44/10 R
[58] Field of Search .................. 44/15 D, 16 F, 10 R; 75/42

[56] References Cited

U.S. PATENT DOCUMENTS 3,692,505  9/1972  Reichl ................................... 201/22

FOREIGN PATENT DOCUMENTS 1272  4/1926  Australia ................................. 44/16 F Primary Examiner—Carl F. Dees
Attorney, Agent, or Firm—Andrus, Sceales, Starke & Sawall

[57] ABSTRACT

A process for the production of fuel from coal for the pressure gasification of coal in a fixed bed reactor comprising the steps of segregating the coal into oversize and undersize fractions, mixing the undersize fraction with sulfite liquor to form an agglomerate and forming the agglomerate into pellets. The pellets are then hardened in a low temperature furnace and subsequently fed through a charging valve into the reactor, together with the oversize fraction.

5 Claims, 1 Drawing Figure

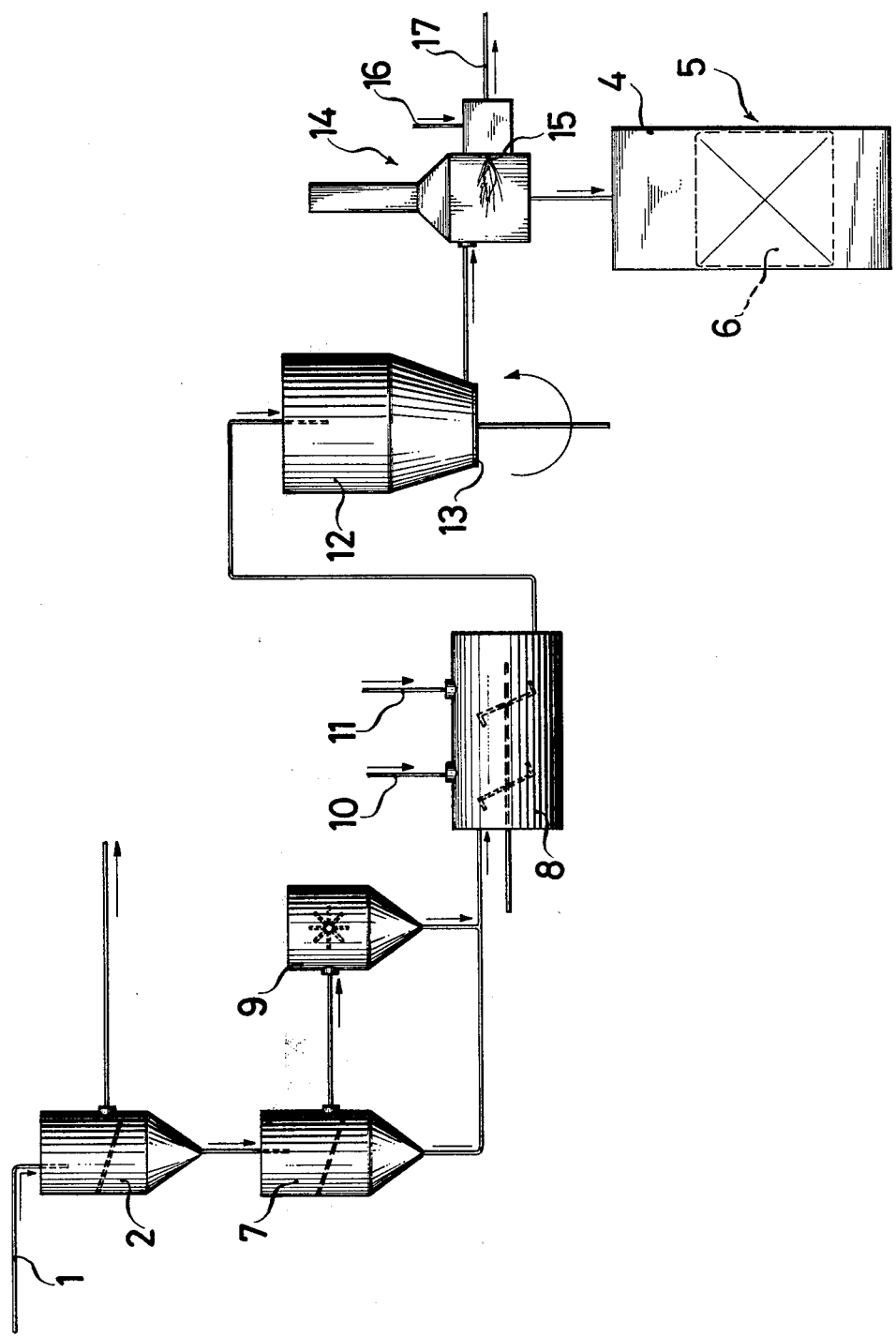

PROCESS FOR THE PRODUCTION OF FUEL FROM FINE COAL FOR COAL PRESSURE GASIFICATION IN A FIXED BED REACTOR

BACKGROUND OF THE INVENTION

This invention relates to a process for the production of fuel, for coal pressure gasification in a fixed bed reactor, from fine coal which is segregated by being graded into an oversize fraction and an undersize fraction, whereby the undersize fraction is pelleted and the pellets are hardened at temperatures below the coking temperature of coal and then subsequently added to the oversize fraction.

The production of special fuels for operating fixed bed reactors for coal pressure gasification aims, amongst other things, to minimise the dust content of the gasification gas and furthermore to achieve better draught in the fixed bed. The reduction of dust content of the gasification gas is essential in the gasification of coal, since the collection of dust in the gasification gas as a rule causes, amongst other things, a condensation of tar constituents and leads to a condensate which not only contains dust and tar but also produces an emulsion with the water content of the gas and the quench water which is hard to break. Under these circumstances thickening of the condensate leads to a viscous mass which is difficult to manipulate and handle. The reduction of the dust content therefore makes it possible to obtain highly fluid tar and hydrocarbons and a definite reduction in the difficulties which are otherwise connected with the handling of a thickened condensate.

It is known from German Auslegeschrift No. 108600 to apply a thickened condensate to the surface of the fixed bed, in order to moisten the whole area of the fixed bed with hydrocarbon compounds and to produce and maintain a type of oil filter in the fixed bed reactor with the desired filtering action and thickness for filtering off the dust. However, this known process does not have the desired result, since the necessary uniform distribution and increase in heat as far as the reaction area is not present in the fixed bed and also since the duration of the various fuel particles in the fixed bed shows great variation.

It is further known, from German Patent Specification No. 827224, to briquette wash waste and flotation waste from coal preparation without a binding agent and to gasify the briquettes into a green state, since such briquettes have sufficient heat resistance. This process cannot be used for the gasification of fine coal, since briquetting without a binding agent results only in the formation of carbon granules and not in the binding together of the carbon granules. The gasification of fine coal is, however, essential for coal pressure gasification in gas/steam turbine power plants, since around 70% of the coal in the usual process for obtaining and preparing pit coal is produced as fine coal and the proportion of undersize granules of 0-2 mm conclusively determines the dust content in the gasifying gas.

In the prior art there is also a process in which the undersize fraction of 0-2 mm which is separated from the oversize fraction of 2-3 mm is pelleted by means of a thickened condensate and the green pellets are added to the oversize fraction (German Offenlegungsschrift No. 2,540,165). However it has proved that these green pellets do not have the necessary fire resistance. In any case, a large proportion of the pellets do not stay firmly in the fixed bed since the lighter parts of the binding agent vaporise too quickly and the pellets do not reach the reaction area. Moreover, the pellets are not abrasion-proof so that considerable amounts of dust are released, particularly in the transport conduits.

Finally, the process described at the outset is known from U.S. Pat. No. 3,692,505. This covers in particular the production of fuel from bituminous coal which has a substantially reduced coking capacity and therefore eliminates the difficulties which arise in the fixed bed with bituminous coal. With this process pelleting is achieved with hot semicoke particles which form nuclei around which the fine grain particles of the pelleted material are arranged. By maintaining the temperatures in the semicoke particles at an exact level and temperatures in the pelleting drum between 330° C. and 600° C., the pellets sinter by agglomeration of the fine coal particles and develop no coking effect in the fixed bed.

This process has the disadvantage that, outside the fixed bed reactor, a considerable quantity of gas is formed from the coal in the production of semicoke particles and in the sintering of the pellets, which is lost for the gasifying gas. Moreover, the known process presumes certain types of coal for the production of the fuel and therefore does not adequately exclude bituminous coal, which nevertheless causes considerable amounts of dust in the gasifying gas.

The invention is based on the problem of producing fuel pellets having better fire resistance and less sensitivity to abrasion and providing them in the fuel, whilst maintaining the coal in the original state until the fuel is fed into the reactor, so as to prevent losses in the gasification gas.

SUMMARY OF THE INVENTION

According to the invention there is provided a process for the production of fuel for coal pressure gasification in a fixed bed reactor from fine coal which is segregated by being graded into an oversize fraction and an undersize fraction, wherein the undersize fraction is pelleted and the pellets are hardened at temperatures below the coking temperature of coal and subsequently added to the oversize fraction, sulphite waste liquor being added to the undersize fraction before pelleting, and the pelleting being effected by placing a binding agent in at least the surface layers of the pellets.

The production of coal briquettes with the aid of sulphite waste liquor is in itself known. However it differs fundamentally from the pelleting according to the invention in that, with briquetting by the formation of undersize granules, the adhesive effect of the sulphite waste liquor thickened by means of heat is utilised (German Patent Specification No. 1,186,825 and Auslegeschrift No. 1,771,433), whereas in the process according to the invention the hardening of the binding agent is used rather than the adhesive effect with the aim of forming solid bridges between the particles of undersize granules. This effect was totally avoided in the production of solid agglomerates known up till now, since the hardening of the binding agent precludes adhesion between the coal particles.

Of course, pellet hardening by the formation of solid bridges among other things by the hardening of the binding agent is also known in itself. However, since up till now it has not been known that adequate strength of the green pellets can be obtained by suitably adjusting the thickening of the sulphite waste liquors, and that it is possible to harden the sulphite waste liquor without sintering the coal, one could not use the sulphite waste liquor, known here for obtaining solid pieces from coal, for the pelleting of undersize granules in obtaining fuel for coal pressure gasification in the fixed bed reactor. One had to start from the principle that the disproportionate thickening of the liquor, occurring by use of temperatures over 100° C. necessary for the hardening of the sulphite waste liquor, leads to a known loss in adhesive power so that cohesion of the undersize coal granules in the green pellets is thwarted. Surprisingly, it has now been shown that the loss in adhesive power is outweighed by the formation of solid bridges by the binding agent.

Thus it is fundamentally sufficient for the surface layers to be hardened so far that, although they still have weak cores, the pellets do not disintegrate during transport into the reactor but reach the fixed bed, on which they are subjected to increased temperatures, undamaged. In this manner harmful abrasion of the pellets is avoided and, moreover, there is a saving in energy which would otherwise be needed outside the reactor for the hardening of the pellets. This hardening is achieved according to the invention in the surface layers of the fixed bed of the reactor by use of the high temperatures occurring there.

If, on the other hand, the diameter of the pellets is small and/or the stress on them is high on the way to the fixed bed, then it can be recommended that hardening of the pellets is effected outside the pressure reactor and thus before the pellets are conducted into the fuel.

BRIEF DESCRIPTION OF THE DRAWINGS

The accompanying drawing illustrates a plant for carrying out a process in accordance with the invention. Since suitable equipment for carrying out the process can comprise apparatus know per se, it is only shown schematically.

DETAILED DESCRIPTION OF THE PREFERRED EMBODIMENT

Fine coal is supplied by a conduit 1 to a pregrading sieve 2 with a mesh size of, for example, 3 mm, which segregates the coal into an oversize fraction with a maximum grain size of about 10 mm and an undersize fraction of 0-3 mm. The oversize fraction obtained forms part of the fuel which is produced and is immediately fed through a charging valve 4 to the fixed bed reactor generally indicated at 5, where it meets with the subsequently treated undersize granules on the fixed bed 6.

The sieve 2 is connected to a further sieve 7 to which the undersize granules of the pre-grading operation are fed. The undersize granules from the sieve 7 are immediately conducted into a mixer 8, while the oversize granules are first crushed in a crusher 9 and then conducted into the mixer 8. In the mixer 8 water and sulphite waste liquors are added through conduits 10 and 11 respectively, and by means of a mechanical mixing device it is guaranteed that the undersize fraction is covered with the sulphite waste liquor as uniformly as possible.

In a granulator 12 the undersize material is mixed with the binding agent and is formed into pellet discs or cones which are conducted over a feeder 13 and then to a means of transport (not shown) connected at the outlet side. Proceeding from grains which are to be formed into the pelleted product, agglomerates are first produced by the adhering together of fine grains. The pellets produced from the agglomeration structure are held together predominantly by capillary action, and their size particularly depends on the fineness of the material and the maintenance of a certain amount of moisture.

The green pellets thus produced do not have adequate strength for use as fuel in the fixed bed reactor 5. However, they do not give rise to difficulties, i.e. they do not disintegrate in a blast furnace 14 connected at the outlet side to the granulator 12, and they burn there with the aid of hot gases which are supplied from a burner 15. This burner is an oil burner of a known construction, to which the necessary air supply and fuel is fed through conduits 17 and 16 respectively.

The temperature in the blast furnace is maintained so that the coking temperature of coal is not reached, with the result that there are no volatile hydrocarbons in the blast furnace but only vapours which appear at the top of the blast furnace. The burning temperature may, for example, be around 145° C. In these circumstances the sulphite waste liquor is first thickened in the surface layers of the pellets and finally hardened. Thus the capillary action is replaced by a structure of solid particles formed by the sulphite waste liquor or its main component, lignite sulphonic acid. Hardening is achieved on the surface of the pellets to such an extent that the pellets are practically abrasion-proof.

The pellets hardened in this way on their surface layers or through to the core are then passed through the charging valve 4 to the fixed bed 6 of the reactor 5, where they meet up with the oversize fraction. The pellets do not disintegrate until they reach the lower layers of the fixed bed, so that excessive dust formation in the gas is eliminated.

In place of the oil burner, waste gases from a gas turbine or the gases obtained from the feed-water heater of a steam turbine can also be used for hardening the pellets in the blast furnace.

I claim:

1. A process for the production of fuel for coal pressure gasification in a fixed bed reactor from fine coal, comprising the steps of:
   grading the coal into an oversize particle fraction and an undersize particle fraction;
   mixing the undersize particle fraction with sulfite liquor;
   forming the mixture into pellets;
   exposing the pellets to a temperature below the coking temperature of the coal to initially thicken and thereafter harden the sulfite liquor at least on the surface of the pellets for forming solid, generally non-adhesive bridges among the particles of the undersize fraction; and
   subsequently adding the hardened pellets to the oversize fraction.

2. A process according to claim 1, wherein hardening of the pellets from beneath the surface layers to the core is additionally effected before addition to the oversize fraction.

3. A process according to claim 1 or 2, wherein hardening of the pellets is effected externally of the fixed bed reactor.

4. A process according to claim 1 or 2, wherein hardening of the pellets from beneath the surface layers to the core is effected in the fixed bed reactor.

5. A process according to claim 1, wherein the pellets are exposed to a temperature of approximately 145° C.

* * * * *